Patented Sept. 11, 1928.

1,684,332

UNITED STATES PATENT OFFICE.

MAX THOMAS, OF WEISSWASSER, OBERLAUSITZ, GERMANY, ASSIGNOR TO PATENT-TREUHAND-GESELLSCHAFT FUL ELEKTRISCHE GLUHLAMPEN M. B. H., OF BERLIN, GERMANY.

METHOD OF PRODUCING GLASS.

No Drawing. Application filed June 26, 1926, Serial No. 118,796, and in Germany August 1, 1925.

This invention relates to a method of producing glass suited particularly for insulating purposes.

It is known that the electrical conductivity of a glass is determined essentially by its alkali oxide content, in particular sodium oxide content. There are therefore selected for this purpose mostly compositions which contain little alkali or are free from alkali. In order that such glass shall not be too difficultly fusible and can be thoroughly melted fluxes other than alkalies must be used. For this purpose boric acid and lead oxide have hitherto been used. While boric acid has the disadvantage of increasing very greatly the cost of the glass, lead oxide in addition to this disadvantage has the further disadvantage that lead containing glass is comparatively soft and does not withstand atmospheric and chemical influences.

In accordance with the present invention it has been found that glasses which contain silicon dioxide, calcium oxide and at least one oxide of a divalent or trivalent metal are particularly suitable for insulation purposes if iron oxide is used as a flux. The effect of the iron oxide in the glass as regards its electrical conductivity is substantially the same as that of boric acid and is less than that of lead oxide. By the addition of iron oxide as a flux glasses melt with ease which with a very small alkali content in particular even with no sodium oxide present produce good glass-like masses and retain very satisfactorily their electrical conductivity. Such a glass has for example the following composition:—

| | Per cent by weight. |
|---|---|
| $SiO_2$ | 67 |
| $K_2O$ | 3 |
| $CaO$ | 10 |
| $BaO$ | 10 |
| $Fe_2O_3$ | 10 |

Even at high temperatures the conductivity is of the order of fused quartz, i. e., is very much less for example than that possessed by porcelain. The excellent insulation properties of this glass are retained when the melting process is so conducted as regards raw material and firing that reduction of the iron oxide is avoided i. e., so that the iron is contained in the glass mostly in the trivalent oxide stage.

I claim:—

1. The process of producing a glass for insulating purposes, which comprises melting a glass batch substantially free of alkali metal and containing silica, an alkali earth metal oxide and an iron oxide sufficient to act as a flux, and maintaining the oxide in its oxidized condition.

2. The process of producing glass for insulating purposes, which comprises melting a glass batch containing silica, an alkali earth metal oxide and an iron oxide sufficient to act as a flux, and maintaining the oxide in its oxidized condition.

3. The process of producing glass for insulating purposes, which comprises melting a glass batch substantially free from alkali metal oxide and containing an alkali earth metal oxide and an oxide of iron, under melting conditions that insure substantially all the iron being in ferric condition.

4. A glass for insulating purposes, containing silicon, alkaline earth metal oxide and ferric oxide, the ferric oxide being maintained in the ferric condition and in sufficient quantity to act as a flux.

In testimony that I claim the foregoing as my invention, I have signed my name.

MAX THOMAS.